United States Patent [19]
Drori

[11] 4,207,181
[45] Jun. 10, 1980

[54] SELF-CLEANING FILTERS

[76] Inventor: Mordeki Drori, 89 Zahal St., Kiron, Israel

[21] Appl. No.: 877,378

[22] Filed: Feb. 13, 1978

[30] Foreign Application Priority Data

Feb. 11, 1977 [IL] Israel ............ 51420
Sep. 20, 1977 [IL] Israel ............ 52968
Sep. 20, 1977 [IL] Israel ............ 52969
Jan. 26, 1978 [IL] Israel ............ 53895

[51] Int. Cl.$^2$ .............................. B01D 35/16
[52] U.S. Cl. .................... 210/111; 55/405; 55/406; 55/450; 210/409
[58] Field of Search ............ 210/90, 108, 111, 304, 210/411, 512 R, 83, 84, 409; 209/144, 211; 55/404, 406, 407, 447, 449, 450

[56] References Cited

U.S. PATENT DOCUMENTS

2,557,375  6/1951  Dickenson ............ 210/111
4,042,504  8/1977  Driori ............ 210/108
4,048,067  9/1977  Cheng ............ 210/512 R Primary Examiner—Frank Sever
Attorney, Agent, or Firm—Benjamin J. Barish

[57] ABSTRACT

Filters self-cleaning by hydrocyclonic action are described, in which one end of the filter housing is mounted at a higher elevation than its opposite end, the filter housing having at its lower end a chamber for accumulating dirt particles washed from the outer surface of the filter body and a discharge port for purging the chamber. Several described embodiments include an auxiliary dirt-sensing filter within the latter chamber to receive on one side dirt particles accumulated in the chamber, its opposite side being connected to a source of lower pressure to produce a fluid flow through the auxiliary filter which flow is sensed to automatically open a valve to discharge the dirt particles accumulated in the chamber. Also described is an embodiment including a pump having a rotor disposed in the filter housing such that the hydrocyclonicly flowing water also drives the pump.

12 Claims, 18 Drawing Figures

SELF-CLEANING FILTERS

BACKGROUND OF THE INVENTION

The present invention relates to filters for removing solid particles from a fluid stream. The invention is particularly directed to, and is therefore described below with respect to, filters for use in water irrigation systems for filtering out dirt particles in the water supply line which may tend to clog drippers, sprinklers, or other water irrigating devices.

The water used in water irrigation systems is frequently so laden with dirt that the filters used in such systems must be cleaned at frequent intervals. This increases the maintenance cost and the down-time of the filters. A number of automatically self-cleaning filters have been designed, wherein the filter is automatically reverse-flushed when the filter body has become so clogged with dirt particles as to produce a predetermined pressure drop. However, such automatically self-cleaning filters are usually of complicated construction and therefore costly to produce.

An object of the present invention is to provide new filter constructions having a self-cleaning capability effective to reduce the maintenance cost and the down-time of the filter.

In addition, water irrigation systems commonly include fertilizer pumps for pumping fertilizer solution into the irrigation water, and filters downstream of the fertilizer pump for filtering out solid particles which may tend to clog irrigation drippers, sprinklers, or other water irrigation devices connected to the line. Various types of fertilizer pumps are in use wherein the driving force is taken from the pressurized water from the water supply line. In such cases, the water used for driving the pump is drained to the ground and is therefore not only wasted, but also produces muddy nuisances around the pump, unless a special recovery container is provided which must be periodically emptied. In addition, the fertilizer pumps commonly used are relatively bulky and complicated and therefore add substantially to the cost of the overall system.

Another object of the invention, therefore, is to provide a combined filter and pump device having advantages in the above respects.

BRIEF SUMMARY OF THE INVENTION

According to one aspect of the present invention, there is provided a filter connectable between an upstream pipe and a downstream pipe, comprising: a tubular housing adapted to be connected between the upstream and downstream pipes such that one end of the housing is at a higher elevation than its opposite end. A cylindrical filter body is disposed within the housing with its outer surface facing and spaced from its inlet opening, which inlet opening is elongated in the longitudinal direction of the filter body. A tubular inlet connection is fixed to an intermediate portion of the housing in alignment with its inlet opening and with its longitudinal axis at an angle to the longitudinal axis of the housing. The tubular inlet connection has means for connecting same to the upstream pipe for inletting fluid through said elongated inlet opening to impinge the outer surface of the filter body substantially tangentially thereto; thereby to produce a cyclonic effect. A tubular outlet connection, having means for connecting same to the downstream pipe, is fixed to the higher end of the housing in communication with the interior of the filter body. The higher elevational end of the tubular housing includes an annular wall constraining the fluid to flow from the interior of the filter body through said tubular outlet connection. The opposite lower end of the tubular housing has a chamber for accumulating dirt particles washed from the outer surface of the filter body by the tangential impingement thereon of the fluid flowing through the tubular inlet connection. A discharge port is provided at the lower end of said chamber for discharging the dirt particles accumulated therein.

According to another aspect of the invention, there is provided with the filter a pump device particularly useful for pumping fertilizer solution into irrigation water and then for filtering same, the pump having a drive rotor disposed in the inlet chamber of the filter such as to be rotated by the cyclonically flowing water therein.

According to a further aspect of the invention, a filter is provided further including a valve for opening and closing the discharge port; a dirt-sensing filter located in the dirt-accumulating chamber to receive on the upstream side thereof dirt particles accumulated in said chamber; a fluid connection connecting the opposite side of said dirt-sensing filter to a source of lower pressure than at the upstream side thereof to produce a fluid flow therethrough; and sensing means sensing when a predetermined quantity of dirt particles have been received on the dirt-sensing filter to automatically open said valve to discharge through said port the dirt particles accumulated in said chamber.

Preferably, the sensing means senses the differential fluid pressure on both sides of the dirt-sensing filter and is effective, when the differential pressure has reached a predetermined maximum, to automatically open said valve.

According to a further aspect of the invention, a filter is provided further including a tubular baffle enclosing the cylindrical filter body and open at one end corresponding to that facing the dirt particle accumulating chamber at the lower end of the housing, the opposite end of the tubular baffle being joined to the annular wall at the higher end of the housing to define therewith a second dirt particle accumulating chamber, and a second discharge port at said higher end of the housing communicating with said second dirt particle accumulating chamber.

According to a still further aspect of the invention, the filter may further include an inner tube disposed within the cylindrical filter body and having one end corresponding to that facing the lower end of the housing, joined to the cylindrical filter body, the opposite end of the tube at the higher end of the housing including a further discharge port.

A filter having one or preferably both of the latter modifications is particularly useful in water irrigation systems containing very small particles to be filtered out of the water, such as small micro-organisms, which might otherwise tend to clog the main filter body. Thus, the larger dirt particles in the cyclonically flowing water would be thrust outwardly by centrifugal forces and would tend to accumulate in the dirt particle accumulating chamber at the lower end of the housing for purging through the discharge port of that chamber. However, where the water also contains substantial quantities of minute particles, such as microorganisms, these particles would move inwardly by centripetal forces. These minute particles, which would otherwise tend to clog the main cylindrical filter body, are substantially blocked from reaching the outer face of the main filter body by the above-mentioned tubular baffle and/or inner tube and would accumulate in the upper end of the housing from where they may be purged via their respective discharge ports.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view of one form of filter constructed in accordance with the invention, FIGS. 1a and 1b being transverse sectional views along lines A—A and B—B of FIG. 1;

FIG. 3 is a transverse sectional view, corresponding to FIGS. 1a and 2a, illustrating a further embodiment of the invention;

DESCRIPTION OF THE PREFERRED EMBODIMENTS

Figures 1, 1A, 3:
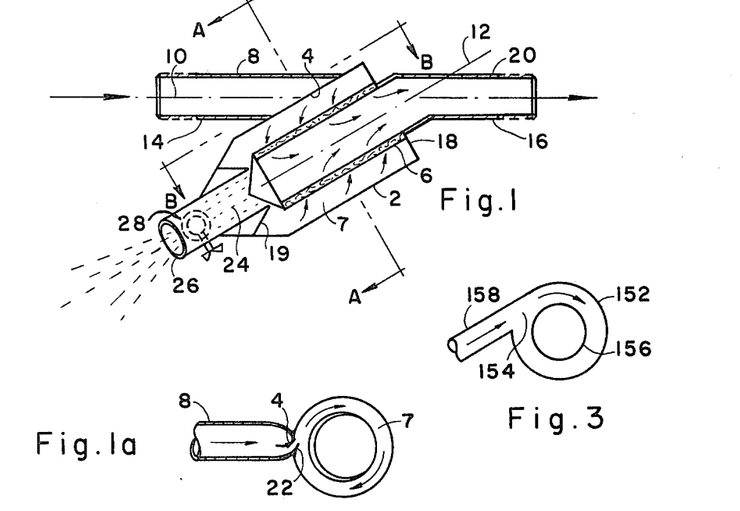
Figure 1B:
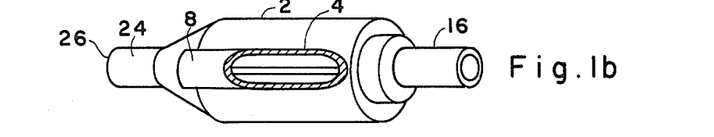

The filter illustrated in FIGS. 1, 1a and 1b comprises a tubular housing, generally designated 2, having an inlet opening 4. A cylindrical filter body 6, which may be a filter screen for example, is disposed within tubular housing 2 substantially coaxial with the housing, the outer cylindrical surface of the filter body facing inlet opening 4 and being spaced from the housing wall to define an annular space or inlet chamber 7. Inlet opening 4 is elongated in the longitudinal direction of the filter body and extends for a major part of its length, as shown particularly in FIG. 1b.

A tubular inlet connection 8 is fixed to an intermediate portion of housing 2 in alignment with its inlet opening 4, the longitudinal axis 10 of the inlet connection 8 being at an oblique angle (e.g., about 30°) to the longitudinal axis 12 of housing 2 and of filter body 6 within it. The outer surface of the tubular inlet connection 8 is formed with threads 14 for connecting same to the upstream pipe (not shown) of the water supply line.

A tubular outlet connection 16 is fixed to one end of the tubular housing 6 substantially coaxial with the tubular inlet connection 8. Outlet connection 16 communicates with the interior of filter body 6, and the end of housing 2 to which outlet connection 16 is fixed is formed with an annular wall 18 which constrains the fluid to flow through the filter body 6 (in the inwardly direction as shown by the arrows) and then through the outlet connection 16. One end of the filter body 6 is fixed to annular wall 18, and the opposite end is supported by a plurality of spaced radial ribs 19 fixed to the inner surface of the housing. The outer surface of outlet connection 16 is also formed with threads 20 for connecting same to the downstream pipe (not shown) of the water supply line.

The fluid flowing into the filter housing 2 via inlet connection 8 enters the housing through the elongated slot 4 and is then deflected by a deflector 22 bordering slot 4, as shown particularly in FIG. 1a, so as to flow substantially tangentially to the outer cylindrical surface of the filter body 6. A cyclonic effect is thus produced by the water flowing through the space 7 between housing 2 and filter body 6. This water flow continuously washes away dirt particles accumulating on the outer surface of the filter body.

The filter is normally attached to the water supply line in the position illustrated in FIG. 1, wherein the end of housing 2 to which the outlet connection 20 is attached, is at a higher elevation than the opposite end of the housing. The latter end of the housing is formed with a chamber 24 in which the dirt particles washed off from the filter body 6 accumulate. The accumulated dirt particles are discharged through a port 26 at the bottom of the housing 2 by means of a valve 28. This valve may be manually opened whenever chamber 24 is to be purged of the accumulated dirt particles; an alternative arrangement is illustrated in FIGS. 6-13 to be described below wherein the valve is automatically opened when the chamber is to be purged.

It will thus be seen that the inlet connection 8, and the outlet connection 16, are both substantially coaxial, enabling the filter to be mounted in-line to a water supply pipe. Further, the water entering the housing 2 through its inlet opening 4 is deflected by deflector 22 so as to flow tangentially to the filter body 6, thereby producing the cyclonic effect washing the filter body outer cylindrical surface of dirt particles as mentioned above. Since inlet opening 4 is elongated and extends for a major part of the length of the filter body, the tangential flow of the water effectively covers and washes a large part of its surface. In addition, since this tangential flow is along the outer surface of the filter body, the water flow tends to move the dirt particles away from the filter body, which is much preferable to an arrangement wherein the tangential flow is on the inner surface of the filter body thereby tending to cause the dirt particles to penetrate into the filter body. Finally, the dirt particles washed from the outer surface of the filter body and accumulated in the bottom chamber 24 may be discharged through port 26 whenever desired or necessary by valve 28.

Figure 2:
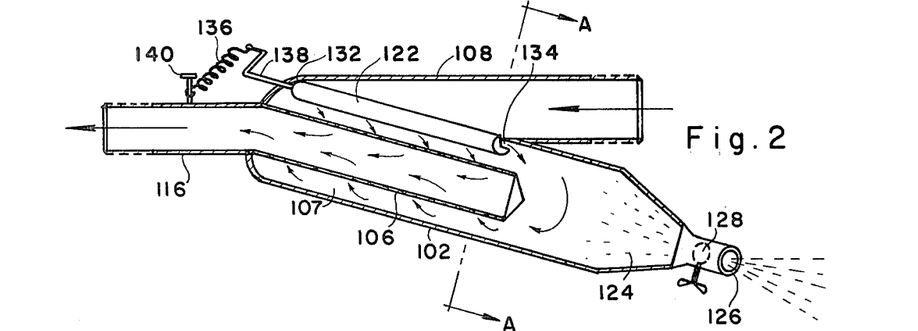
FIG 2 is a longitudinal sectional view of a second form of filter constructed in accordance with the invention, FIG. 2a being a transverse sectional view along lines A—A of FIG. 2.
Figure 2A:
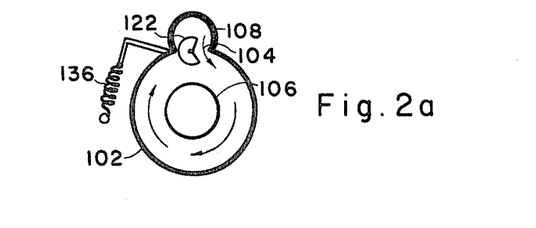

FIGS. 2 and 2a illustrate another form of the invention, wherein the deflector (22 in FIG. 1a), which deflects the inletted water to flow tangentially to the filter body, instead of being fixed as in the previously described embodiment, is movably mounted to the housing so as to be adjustable. The remaining elements of the filter are basically the same as in the above-described embodiment, and therefore corresponding parts have been numbered with the same reference numerals but increased by "100."

Thus, in the form of the invention illustrated in FIGS. 2 and 2a, the filter includes a tubular housing 102 formed with an inlet opening 104. A cylindrical filter body 106 is disposed within the housing and is spaced from its inner wall to define the annular space or inlet chamber 107. Housing inlet opening 104 is elongated in the longitudinal direction of the filter body and extends for a major part of its length. A tubular inlet connection is 108 is fixed to an intermediate portion of the housing aligned with inlet opening 104 with the longitudinal axis of connection 108 at an oblique angle to the longitudinal axis of the housing, as described above in FIG. 1 and as shown particularly in FIG. 2. A tubular outlet connection 116 is fixed to one end of the housing in communication with the interior of filter body 106 so that the water flowing through the filter body passes out through the outlet connection 116. The bottom end of the housing is formed with a chamber 124 for accumulating the dirt particles washed off the outer surface of the filter body, and with a discharge port 126 opened by a manual valve 128 for discharging the accumulated dirt particles.

The deflector, generally designated 122, is pivotably mounted by pins 132 and 134 within the housing 102 at the opposite ends of elongated opening 104. It is biased towards the position tending to close inlet opening 104 by means of a coil spring 136 attached at one end to a rod 138 fixed to deflector 122, and at the opposite end to a fastener 140 fixed to outlet connection 116 of the filter housing.

It will be seen that, at low rates of water flow inletted through the inlet connection 108, deflector 122 will be biased by spring 136 to restrict the inlet opening 104. This will produce a tangential flow of reduced cross-section, and therefore of larger velocity, around the outer surface of filter body 6. However, as the rate of flow of the water through inlet 108 increases, deflector 122 will pivot against the force of spring 136, to enlarge the cross-sectional area of the passageway through the inlet opening 104, thereby avoiding an unduly large pressure-drop at the inlet opening.

The operation of the filter illustrated in FIGS. 2 and 2a is otherwise the same as described above with respect to FIGS. 1, 1a, and 1b, in that the cyclonic effect produced by the tangential flow of the water around the outer surface of filter body 106 washes dirt particles from its outer surface and accumulates the dirt particles in chamber 124 at the lower end of the filter housing, the dirt particles being discharged through port 126 whenever desired by opening valve 128.

Instead of using a spring (136) for moving deflector 122, the deflector may be moved by other means, such as a piston and cylinder arrangement, or by a manual presetting arrangement.

FIG. 3 illustrates a further embodiment of the invention, similar to that illustrated in FIGS. 1, 1a and 1b, except that the tangential water flow around the outer surface of the filter body is produced, not by the provision of a deflector (e.g.22), but rather by forming the inlet opening itself substantially tangential to the outer surface of the filter body. Thus, as shown in FIG. 3, the inlet opening 204 is the filter housing 202 is produced substantially tangential to the outer surface of filter body 206, so that the water flow through the inlet connection 208 and the inlet opening 204 is tangential to the outer surface of the filter body 206, producing the cyclonic effect washing the dirt particles away from its outer surface. The embodiment of FIG. 3 otherwise includes the same structure as described above with respect to FIGS. 1, 1a, 1b, and operates in the same manner.

Figures 4, 5:
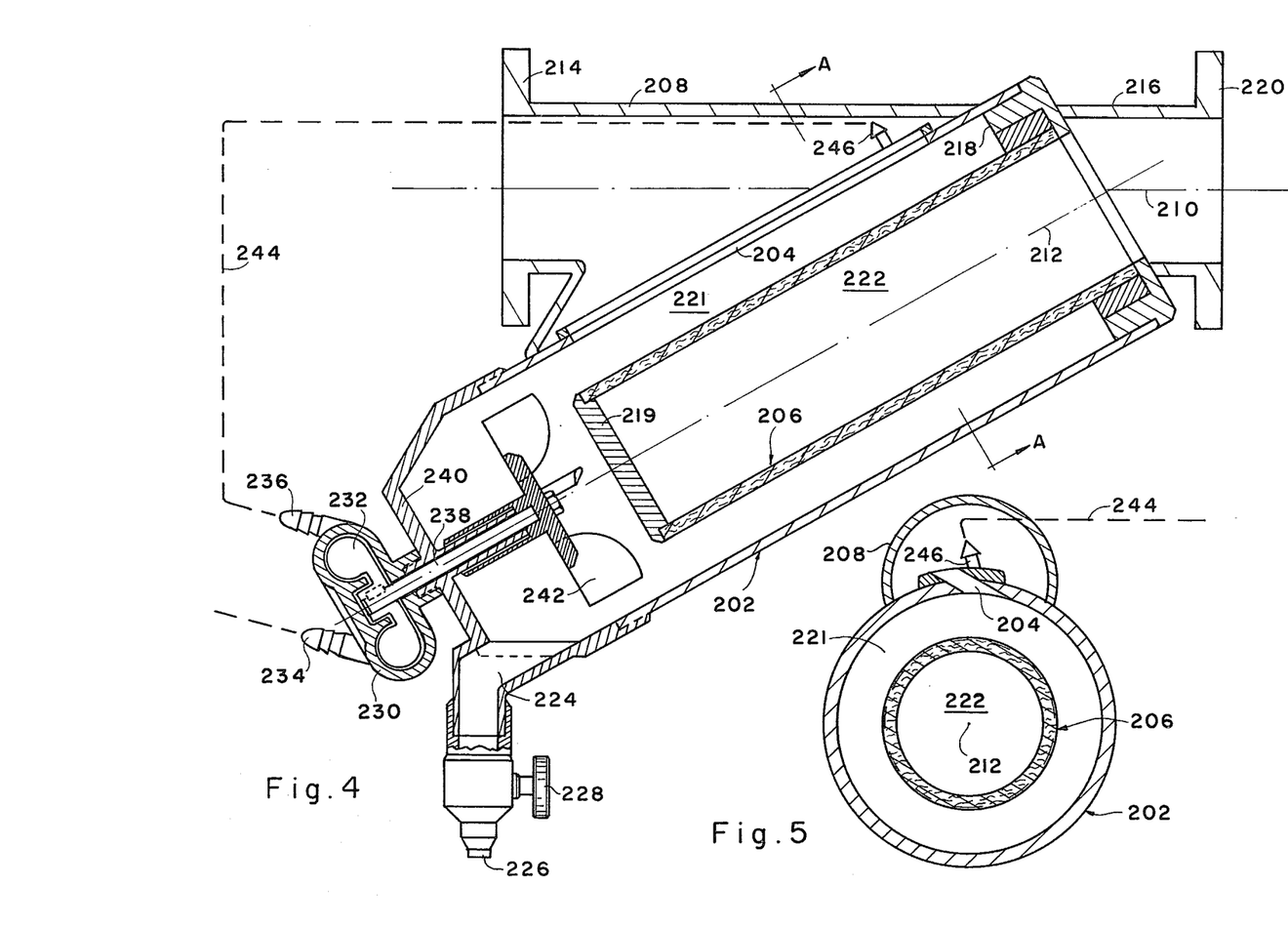
FIG. 4 is a longitudinal sectional view of a combined filter and pump constructed in accordance with the invention.
FIG. 5 is a transverse sectional view along lines A—A of FIG. 4.

FIGS. 4 and 5 illustrate a combined filter and pump device comprising a tubular housing, generally designated 202, having an inlet opening 204, and a cylindrical filter body 206. The latter may be a filter screen for example and is disposed within tubular housing 202 substantially coaxial with the housing, with the outer surface of the filter body facing inlet opening 204. Inlet opening 204 is elongated in the longitudinal direction of the filter body 206 and extends for a major part of its length, as shown in FIG. 4.

A tubular inlet connection 208 is fixed to an intermediate portion of housing 202 in alignment with its inlet opening 204, the longitudinal axis 210 of the inlet connection 208 being at an oblique angle (e.g. about 30°) to the longitudinal axis 212 of housing 202 and of filter body 206 within it. The outer surface of the inlet connection 208 is formed with a flange 214 for connecting same to the upstream pipe (not shown) of the water supply line.

A tubular outlet connection 216 is fixed to the tubular housing 202 substantially coaxial with the inlet connection 208. The end of housing 202 to which outlet connection 216 is fixed is formed with an annular wall 218 threadedly receiving one end of the filter body 206, the opposite end of the filter body being closed by an end wall 219. Outlet connection 216 is also formed with a flange 220 for connecting same to the downstream pipe (not shown) of the water supply line.

It will be seen that the filter body 206 is disposed within housing 202 in the path of the water as it flows from the inlet connection 208 to the outlet connection 216, the annular wall 218 at one end of the filter and the end wall 219 at the opposite end of the filter constraining the water to flow through this path. The filter body 206 thus defines an inlet chamber 321 between the outer surface of the filter body 206 and the inlet opening 204, and an outlet chamber 222 centrally of the filter body 206, between its inner surface and the outlet connection 216.

As shown particularly in FIG. 5, inlet opening 204 is defined by a narrow passageway formed at an angle to the longitudinal axis 212 of the filter body 206 so as to cause the water flowing into the inlet chamber 221 to impinge the outer surface of the filter body 206 substantially tangentially thereto, and thereby to produce a cyclonic flow of the water within the inlet chamber 221. As described in FIGS. 1-3 above, this cyclonic flow of the water continuously washes away dirt particles accumulating on the outer surface of the filter body 206.

The device is normally attached to the water supply line in the position illustrated in FIG. 4, wherein the end of housing 202 to which the outlet connection 216 is attached is at a higher elevation than the opposite end of the housing. The dirt particles washed from the filter body by the cyclonically flowing water accumulated at the lower end 224 of chamber 221, and are discharged through a port 226 by means of valve 228 which may be opened manually or automatically) whenever chamber 221 is to be purged of the accumulated dirt particles, as described above with respect to FIGS. 1-3.

In the FIGS. 4–5 embodiment, the cyclonically flowing water in the inlet chamber 221 is exploited for driving a fertilizer pump. For this purpose, the lower end 223 of the filter housing 202 containing the dirt discharge 226 has attached thereto a pump housing 230 containing a rotary impeller 232 for pumping fertilizer solution introduced through an inlet nipple 234 to an outlet nipple 236. Impeller 232 is carried at one end of a rotary shaft 238, which shaft passes through end wall 240 closing the lower end of the filter housing 202, the opposite end of shaft 238 carrying a drive rotor 242 disposed within the inlet chamber 221 of the filter housing.

The outlet 236 from pump 230 is connected by a tube 244 to a fertilizer inlet nipple 246 for introducing fertilizer solution into the water entering the inlet chamber 221 at the upstream side of the filter body 206.

It will thus be seen that the cyclonically flowing water in the inlet chamber 221 of the filter not only continuously washes the outer cylindrical surface of filter body 206 of dirt particles, which are discharged through port 226, but also drives rotor 242 of the fertilizer pump 230. Accordingly, no water need be wasted in order to drive the fertilizer pump; moreover, a simpler, more compact, and less expensive pump construction can be used since a substantial part of it, namely the drive section (rotor 242) is disposed within the filter housing. Further, since the pump is driven by the water flowing through the filter, the pump output will be approximately proportional to the quantity of the water flow.

In addition (as particularly seen in FIG. 5) the fertilizer solution inlet nipple 246 is in the narrow passageway 204 leading into the inlet chamber 221. This passageway is of substantially smaller cross-sectional area than either the inlet chamber 221 or the inlet connection 208, and therefore the water flowing through it is at a higher velocity and a lower static pressure than when flowing through either the inlet connection 208 or inlet opening 204. By introducing the fertilizer solution through the inlet connection 246 at this narrow passageway, as shown in FIG. 5, the low pressure within the passageway is utilized for aiding in drawing the fertilizer solution from fertilizer pump 230 into the irrigation water. Since the fertilizer solution is introduced into the irrigation water at a point just upstream of the filter body 206, the latter will remove any solid particles which might clog drippers, sprinklers, or other irrigation devices before the water is outletted to the water supply line.

If desired, the mounting for the pump rotor blade 242 could be made adjustable so as to enable the rotor blade to be extended into the inlet chamber 221 towards, or actually to underlie, the inlet opening 204, in order to increase the output of the pump.

Figures 6, 7, 8, 9:
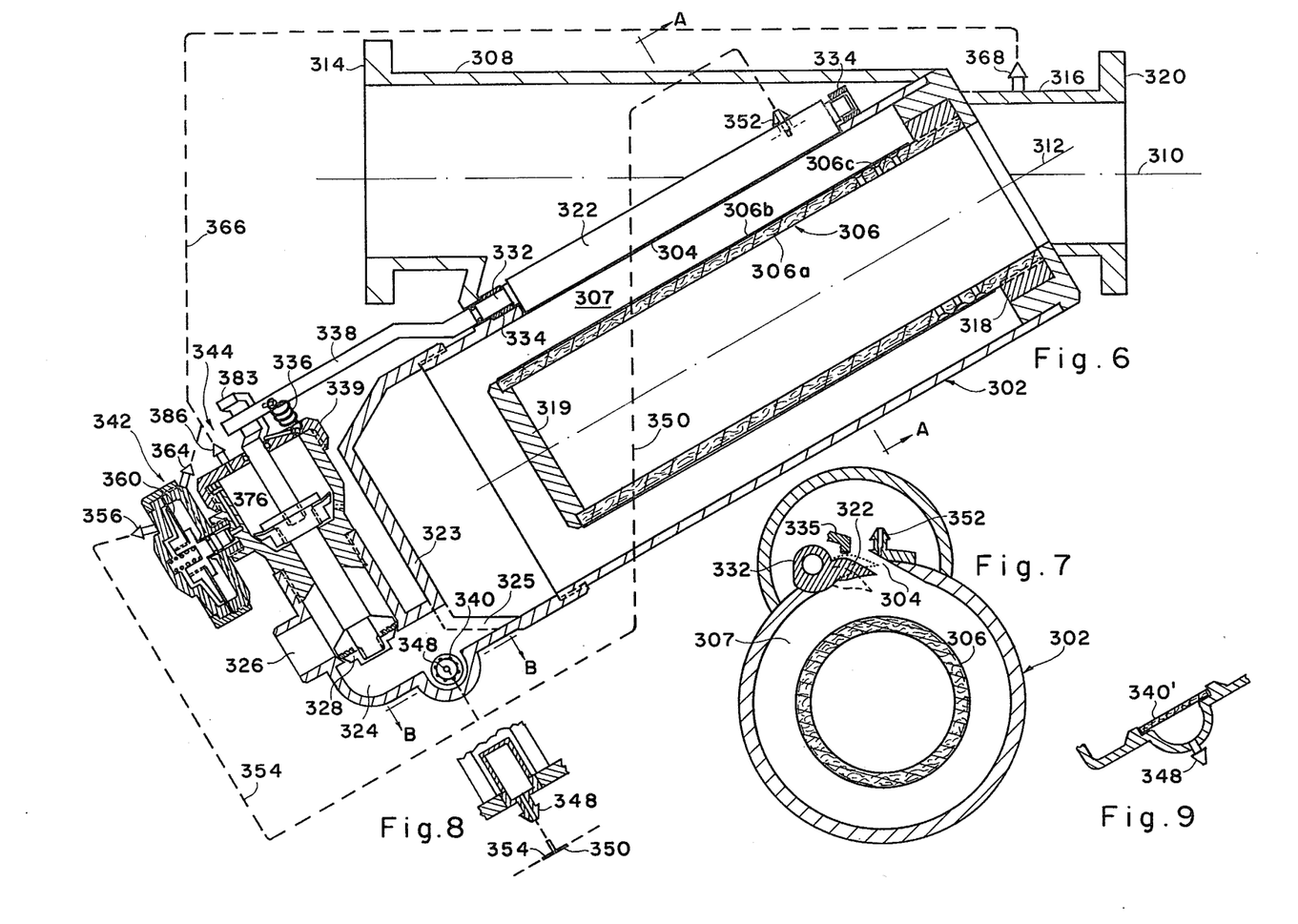
FIG. 6 is a longitudinal sectional view of another filter constructed in accordance with the invention.
FIG. 7 is a transverse sectional view along lines A—A of FIG. 6.
FIG. 8 is a sectional view along lines B—B of FIG. 6.
FIG. 9 is a sectional view similar to that of FIG. 8 but illustrating a variation.

The filter illustrated in FIGS. 6–8 of the drawings is also of the hydrocyclonic type as described with respect to FIGS. 1–5. It comprises a tubular housing, generally designated 302, having an inlet opening 304, and a cylindrical filter body 306 whose outer surface faces inlet opening 304 and is spaced from the housing wall to define an annular space 307.

Filter body 306 may include a cylindrical support 306a having a filter screen 306b secured thereto by fasteners 306c. Inlet opening 304 is elongated in the longitudinal direction of the filter body and extends for a major part of its length.

A tubular inlet connection 308 is fixed to an intermediate portion of housing 302 in alignment with its elongated inlet opening 304, the longitudinal axis 310 of the inlet connection 308 being at an oblique angle (e.g. about 30°) to the longitudinal axis 312 of housing 302 and of filter body 306 within it. The outer surface of inlet connection 308 is formed with a flange 314 for connecting same to the upstream pipe (not shown) of the water supply line.

A tubular outlet connection 316 is fixed to one end of the tubular housing 302 substantially coaxial with its inlet connection 308 and in communication with the interior of filter body 306. One end of the filter body is threadedly received on an annular ring 318 fixed to housing 302, and its opposite end is closed by an end wall 319, so that the water entering through inlet connection 308 and passing through inlet 304 must pass through the filter screen 306b of the filter body before existing through the outlet connection 316. The latter is formed with a flange 320 for connecting same to the downstream pipe (not shown) of the water supply line. Elongated opening 304 through which the fluid enters the filter housing 302 is in the form of a narrow passageway, shown particularly in FIG. 7, one wall of which is defined by a pivotable deflector 322 which deflects the water to flow substantially tangentially to the outer surface of the filter body 306. A cyclonic effect is thus produced in the water flowing through space 307, so that the water flow continuously washes away dirt particles accumulating on the outer surface (upstream side) of the filter body.

The filter housing 302 is normally attached to the water supply line in the position illustrated in FIG. 6, wherein the end of the housing fixed to the outer connection 316, as well as the inlet connection 308, is at a higher elevation than its opposite end. The latter end of the housing is formed with a chamber 324 in which accumulate the dirt particles washed off from the filter body 306, the particles being directed into the chamber 324 by means of an end wall 323 having a passageway 325. The dirt particles accumulated in chamber 324 are discharged through a port 326 at the bottom of housing 302 by means of a valve, generally designated 328, which is automatically opened, in a manner to be described below, whenever chamber 324 is to be purged.

Deflector 322 is pivotably mounted by a shaft 332 fixed thereto and journalled in bearings 334 at the opposite ends of the housing inlet passageway 304. The deflector is biased towards a fixed stop 335 (FIG. 6) by means of a coil spring 336 (FIG. 6) attached at one end to an extension 338 of deflector shaft 332, and at the opposite end to a fixed element 339. The arrangement is such that, at low rates of flow, the deflector 322 is biased by spring 336 to restrict passageway 304, to produce a tangential flow of reduced cross-section, and therefore of higher velocity, around the outer surface of filter body 306. At higher rates of flow, deflector 322 pivots against the force of spring 336 to enlarge passageway 304; thus, a substantial cyclonic action is produced without an unduly large pressure drop.

Valve 328 is automatically opened whenever a substantial quantity of dirt particles accumulate within compartment 324, in order to discharge the dirt particles through port 326. The time at which the valve is to be actuated is sensed by a dirt-sensing filter 340 at the bottom of the housing 302 slightly upstream of the dirt discharge port 326. Filter 340 controls a differential-pressure sensor unit generally designated 342, which in turn controls a valve actuator unit, generally designated 344.

Figure 6A:
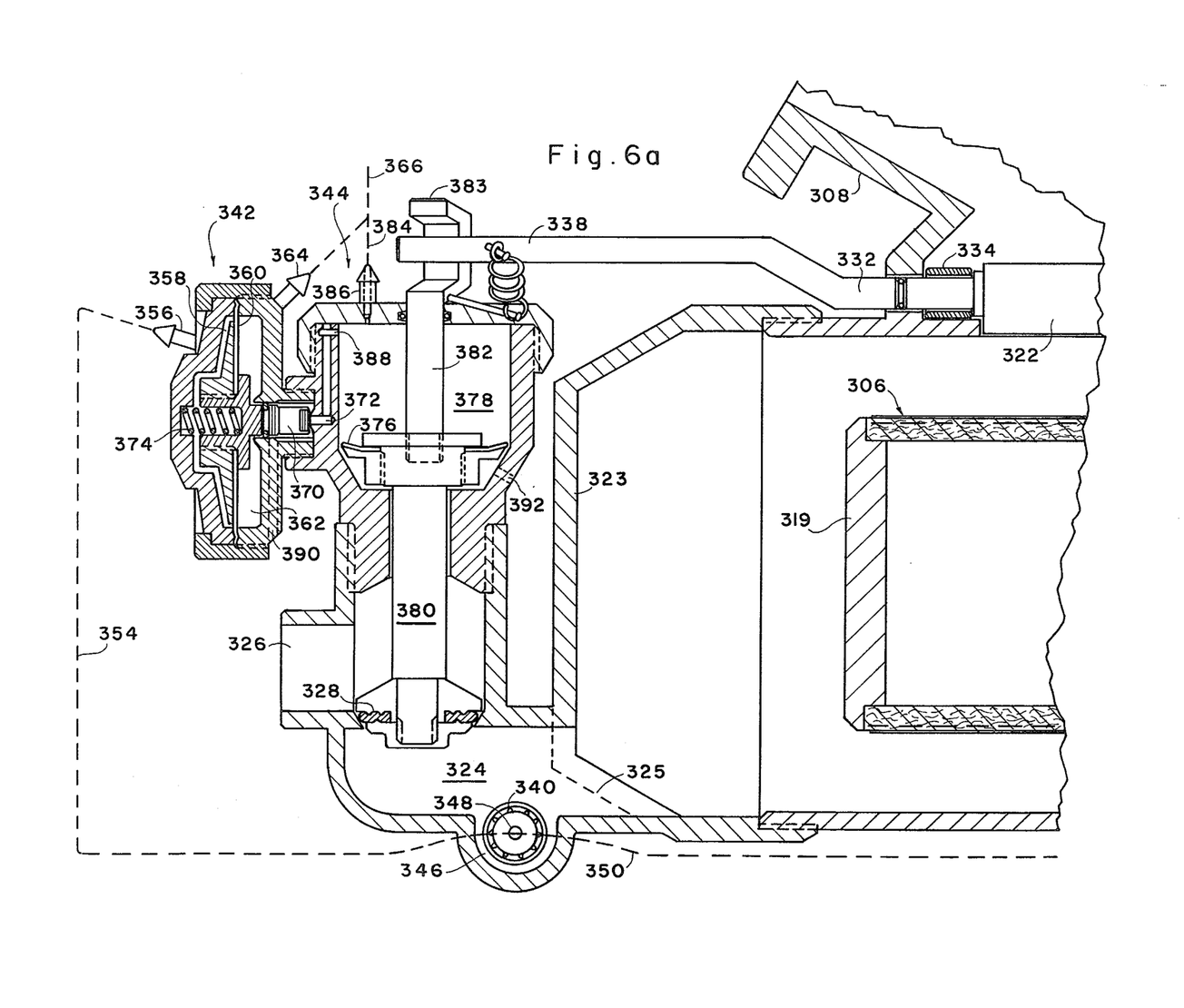
FIG. 6a is an enlarged fragmentary view of a portion of the filter of FIG. 6.

As best seen in FIG. 6a, the dirt-sensing filter 340 is of cylindrical shape and is disposed within a recess 346 formed in the lower wall of the dirt-accumulating chamber 324 so that the dirt will cover the outer surface of the filter as it accumulates within the chamber. Filter 340 is provided with a nipple 348 (also see FIG. 8) communicating with its interior and is connected by a tube 350 to another nipple 352 (FIGS. 6 and 7) communicating with the narrow passageway inlet 304 to the main filter body 306. The interior of filter 340 is also connected via nipple 348 and another tube 354, to another nipple 356 communicating with a chamber 358 (FIG. 6a) at one side of a displaceable diaphragm member 360 in the differential-pressure sensor unit 342. A chamber 362 on the opposite side of diaphragm 360 is connected, via nipple 364, tube 366, and nipple 368 (FIG. 6), to the outlet connection 316 of the filter housing 302.

The sensor diaphragm 360 carries a cap 370 (FIG. 6a) adapted to close a port 372 in the actuator unit 344 for valve 328, such that cap 370 normally closes port 372 under the action of a spring 374 and the pressure in compartment 358; however, if the pressure in the latter compartment drops below a predetermined value, the pressure in the opposite compartment 362 is sufficient to displace diaphragm 360 to cause its cap 370 to uncover port 372. When this occurs, as will be described more particularly below, the actuator unit 344 is actuated to move valve 328 to its open position with respect to the dirt-discharge port 326.

The valve actuator unit 344 includes a piston 376 movable within a cylinder chamber 378. Piston 376 is connected by a stem 380 to valve 328, and by a further stem 382 to a hook 383 which encloses the end section 338 of the deflector shaft 332. End section 338 is eccentric with respect to deflector shaft 332 so that when piston 376 is actuated, it pivots the shaft (clockwise, FIG. 7) in the direction enlarging passageway 304.

The filter outlet pressure from nipple 368 is also communicated, via tube 366, tube 384 and nipple 386, to chamber 378 on one side of piston 376. The latter chamber communicates with port 372 via a bore 388, and whenever the port is closed by cap 370 of the differential-pressure sensor unit 342, the pressure within chamber 378 is sufficient to hold piston 376 in the position illustrated in FIG. 6a wherein valve 328 closes the dirt-discharge port 326. However, whenever port 372 is uncovered by cap 370 of the sensor unit 342, the pressure within chamber 378 is vented to the atmosphere via bore 388, port 372, and another bore 390 formed in a wall of the pressure sensing unit 342 and leading to the atmosphere. The latter bores, starting with bore 388, are all of larger cross-section than the bore from nipple 386 into chamber 378, so that when port 372 is uncovered, the pressure in chamber 378 is vented to the atmosphere, whereupon the pressure on the opposite side of piston 376 (provided a bore 392 from the upstream end of the filter housing 302) is sufficient to actuate piston 376 upwardly, thereby causing its valve 328 to open the dirt-discharge port 326.

At the same time, stem 382 of piston 376, by virtue of its hook 383 encircling eccentric extension 338 of the deflector shaft 338, rocks the deflector 322 to enlarge passageway 304, and thereby to sweep away any large dirt particles, such as pebbles and stones, which may have become lodged in the narrow passageway 304, these large particles also being discharged through chamber 324 and port 326.

The automatic filter illustrated in FIGS. 6–8 operates as follows:

During the normal operation, sensor diaphragm 360, piston 376, and valve 328 are all in their normal positions as illustrated in FIG. 6a. The water inletted through inlet connection 308 is directed by deflector 322 through the narrow passageway 304 tangentionally to, so as to produce a cyclonic flow around, the main filter body 306. This cyclonic flow is effective to continuously wash the outer cylindrical surface of the filter body free of dirt particles, which particles, since valve 328 is closed, accumulate within the lower chamber 324 of the filter housing. In addition, the low static pressure produced at the narrow inlet passageway 304 is transmitted via tube 350 to the interior of the dirt-sensor filter 340 in the dirt accumulating chamber 324, so that there is a continuous circulation of the water from the interior of filter 340 to the narrow inlet passageway 304. Under these normal conditions, the pressure within the dirt-sensor filter 340, communicated to chamber 358 of the differential-pressure sensor unit 342, is sufficient to hold diaphragm 360 in the illustrated position, wherein its cap 370 covers port 372, so that the pressure within chamber 378 holds piston 376 in the illustrated position wherein valve 328 is closed. Accordingly, the dirt will continuously accumulate within chamber 324.

As more dirt accumulates within chamber 324, it will increasingly cover the outer surface of the sensor filter 340, thereby increasing the pressure drop between its outer upstream and inner (downstream) surfaces. A point will be reached when the accumulation of the dirt on the sensor filter 340 drops the pressure within the filter (which pressure is communicated to chamber 358 of the pressure-sensor unit 342) sufficiently so that diaphragm 360 of the sensor unit 342 is actuated (leftwardly in FIG. 6a) to cause its cap 370 to uncover port 372. When this occurs, the pressure within chamber 378 of the valve actuator unit 344 is vented to the atmosphere via bores 388 and 390, whereupon the pressure on the opposite side of piston 376 (applied via bore 392) moves the piston upwardly to cause valve 328 to open port 326. This causes the dirt accumulated within the chamber 324 to be discharged through the latter port.

The same actuation of piston 376 also rocks deflector stem 332, by virtue of its eccentric end section 338, in the clockwise direction illustrated in FIG. 7 to increase the cross-sectional area of the inlet passageway 304, whereupon any large dirt particles (such as pebbles or stones) lodged in this narrow passageway, will be washed out through compartment 324 and port 326 with the other dirt accumulated in compartment 324. As soon as the dirt has been purged from compartment 324, the pressure drop across the dirt-sensing filter 340 will decrease to the point of returning diaphragm 360 to its normal position closing port 372, whereupon chamber 378 is pressurized to return piston 376 to its normal position closing valve 328.

It will be seen that the device of FIGS. 6–8 provides a number of advantages: First, it produces a cyclonic flow of the water around the main filter body 306 so as to continuously wash the outer cylindrical surface of the filter body of dirt particles, as in the devices of FIGS. 1–5. In addition, it continuously regulates (by virtue of the spring-biassed deflector 322) the tangential flow around the main filter body 306 to maximize the cyclonic flow effect under low flow conditions as well as under high flow conditions without producing an undue pressure-drop under high flow conditions. Further, by virtue of the dirt-sensing filter 340, it continuously senses the degree of accumulation of the dirt in chamber 324, and automatically opens valve 326 to purge the dirt from that chamber whenever the dirt accumulation has reached a predetermined maximum. Finally, it also purges through port 326 any large dirt particles (e.g. pebbles and stones) that may have become lodged in the narrow inlet passageway 304, these large dirt particles being washed away upon actuation of valve 328 opening port 326 by rocking the deflector 322 to enlarge passageway 304.

Preferably, the cross-sectional area of nipple 348 leading into the interior of the dirt-sensing filter 340 is larger than that of nipple 352 leading into the narrow inlet passageway 304, so that the pressure within chamber 358 of the sensor unit 342 will more closely follow the pressure within the filter 340. Instead of using a pressure-sensitive device, there could be used a flow-sensitive device detecting the flow in tube 352, which flow will drop with an increase in dirt-accumulation over the dirt-sensor filter 340. Also, instead of connecting the interior of filter 340 to the narrow inlet passageway 304 to provide a continuous flow thereto, the interior of filter 340 may be vented to the atmosphere by a small hole, whereupon there will be a slow trickle of the water externally of the device.

FIG. 9 illustrates a further variation, wherein instead of using a cylindrical dirt-sensing filter 340, there is used a filter 340' which is substantially planar. The construction and operation of the modification in FIG. 9 are otherwise the same as described above.

Figures 10, 11, 12, 13:
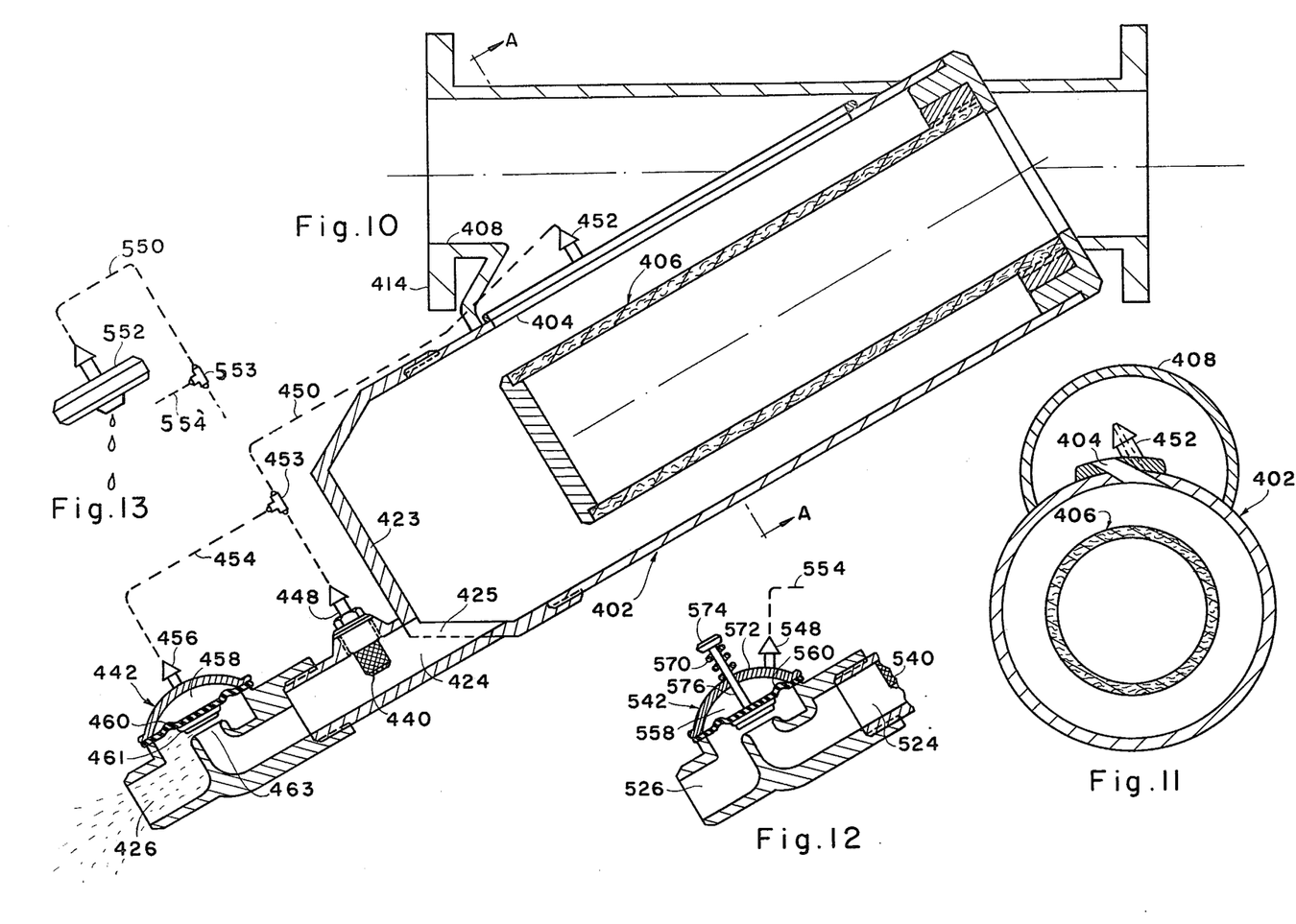
FIG. 10 is a longitudinal sectional view of another filter constructed in accordance with the invention.
FIG. 11 is a transverse sectional view along lines A—A of FIG. 10.
FIG. 12 illustrates a modification of the embodiment of FIG. 11.
FIG. 13 illustrates a further modification applicable to both embodiments of FIGS. 6 and 10.

FIGS. 10 and 11 illustrate another embodiment of the invention wherein, instead of using the pressure sensor unit 342 and the valve actuator unit 344, there is included a simple diaphragm valve, generally designated 442, for automatically opening the dirt-purging port to discharge the dirt accumulated within the filter.

The filter illustrated in FIGS. 10 and 11 comprises a housing 402 having an elongated narrow-passageway, inlet opening 404, a cylindrical filter body 406, an inlet connection 408, and a connecting flange 414, all as described above with respect to the filter of FIG. 6-8. In addition, the filter housing includes an end wall 423 formed with a dirt-accumulating chamber 424 communicating when the upstream side of the filter body 406 by means of a passageway 425, the dirt being periodically discharged through a dirt-purging port 426. The discharge of the dirt is automatically controlled by a dirt-sensing filter 440 within chamber 424, which filter directly controls the diaphragm valve 442, in the manner to be described below.

As in the embodiment of FIGS. 6-8, a nipple 448 communicating with the interior (downstream side) of the dirt-sensing filter 440 is connected by a tube 450 to nipple 452 communicating with the narrow passageway inlet 404 to the main filter body 406. Nipple 448 is also connected, via a T-fitting 453 and a tube 454, to another nipple 456 communicating with chamber 458 in the diaphragm valve 442. The opposite face of diaphragm 460 carries a valve member 461 cooperable with a valve opening 463 communicating with the dirt-accumulating chamber 324.

Diaphragm valve 442 may be of a known construction wherein its valve member 461 is normally in an open position with respect to the valve opening 463, but is moved to its closed position whenever its chamber 458 is pressurized above a predetermined pressure. In the arrangement illustrated in FIG. 10, the surface of diaphragm 460 exposed to the pressure within chamber 458 is substantially larger than the opposite surface carrying its valve member 461, so that the pressure within chamber 458 required to move the diaphragm to its closed position will be substantially less than the pressure on the opposite side (the valve-member 461 side) of the diaphragm.

The filter illustrated in FIGS. 10 and 11 operates as follows: The low static pressure produced at the narrow inlet passageway 404 is transmitted via tube 450 to the interior (upstream side) of the dirt-sensing filter 440 in the dirt-accumulating chamber 424, so that there is a continuous circulation of the water from the interior of filter 440 to the narrow inlet passageway 404 as described in connection with FIGS. 6-8. When there is relatively little dirt accumulated in chamber 424, there will be a relatively small pressure drop to fitting 453 in this circulation path of the water, so that the chamber 458 face of diaphragm 460 will be almost at the same pressure (namely, line pressure) as the opposite face of diaphragm 460. Since the face of diaphragm 460 exposed to the pressure within chamber 458 (which pressure is the same as that at the downstream side of the dirt-sensing filter 440) is of larger surface area than its opposite face carrying valve member 461 (the latter face being exposed to the pressure in chamber 424 which is the same as the pressure at the upstream side of the dirt-sensor filter 440), under these normal conditions when chamber 424 is relatively clean, diaphragm 460 will be displaced by the pressure in chamber 458 to cause valve member 461 to close opening 463.

As dirt accumulates within chamber 424, it will increasingly cover the outer surface of the sensing filter 440 thereby increasing the pressure drop between its outer (upstream) and inner (downstream) surfaces, until a point is reached when this pressure drop, communicated by tube 454 to chamber 458, is sufficient to cause diaphragm 460 to move to its open position with respect to valve opening 463. When this occurs, the dirt accumulated in chamber 424 will be discharged through port 426 by the line pressure. This causes the pressure drop across the dirt-sensing filter 440 to decrease, thereby increasing the pressure within chamber 458 to cause its disphragm 460 to close opening 463.

FIG. 12 illustrates a modification of FIG. 10, wherein the diaphragm valve, designated 542 in FIG. 12, is normally biassed to its open position and is automatically closed as soon as the pressure within the filter, particularly its dirt-accumulating chamber 524, reaches a predetermined minimum pressure. Such an arrangement may be desirable to permit purging a water irrigation line of dirt accumulated in the line after a long period of non-use. In such a case, the line is frequently so filled with dirt that the water first passes a very low rate of flow through the line and the filter, which rate of flow may be insufficient to produce the hydrocyclonic effect for cleaning the main filter body. FIG. 12 illustrates an arrangement wherein the dirt-purging port 526 is initially open, to discharge the dirt from the line until the pressure within the line builds up to a predetermined minimum (for example, 0.5 atmosphere), at which time the diaphragm valve 542 automatically closes port 526 and thereafter operates in the manner described above to automatically open the port whenever the amount of dirt within chamber 524, as sensed by the dirt-sensing filter 540, reaches a predetermined maximum.

Diaphragm 560 in the FIG. 12 modification may be automatically biassed to its open position by means of a spring 570 interposed between the diaphragm valve housing 572 and the head 574 of a stem 576 passing through an opening in housing 572, the opposite end of stem 576 being secured to diaphragm 560. Spring 570 may be selected so as to bias diaphragm 560 to its open position until the atmospheric pressure within chamber 558 reaches 0.5 atmosphere, at which time the valve is automatically closed. Thereafter, valve 542 operates as described above to open port 546 whenever filter 540 senses an undue accumulation of dirt within chamber 524.

As mentioned earlier, instead of connecting the interior of the dirt-sensing filter to the low-pressure, narrow inlet passageway, to provide a continuous flow through the latter filter, the interior of the filter may be vented to the atmosphere for this purpose. This is shown in FIG. 13, wherein tube 550 from fitting 553 leading to the interior of the dirt-sensing filter (not shown), instead of being connected to the narrow inlet passageway (304 or 404), is connected instead to a dripper unit, generally designated 552, provided with a small outlet opening to permit a slow drip or trickle of the water externally of the device. The pressure at fitting 553, which varies with the pressure drop, across the dirt-sensing filter, is transmitted via tube 554 either to the diaphragm valve unit (442, in the FIG. 10 embodiment) or to the pressure sensor unit (342, in the FIG. 6 embodiment) as described above.

Figure 14:
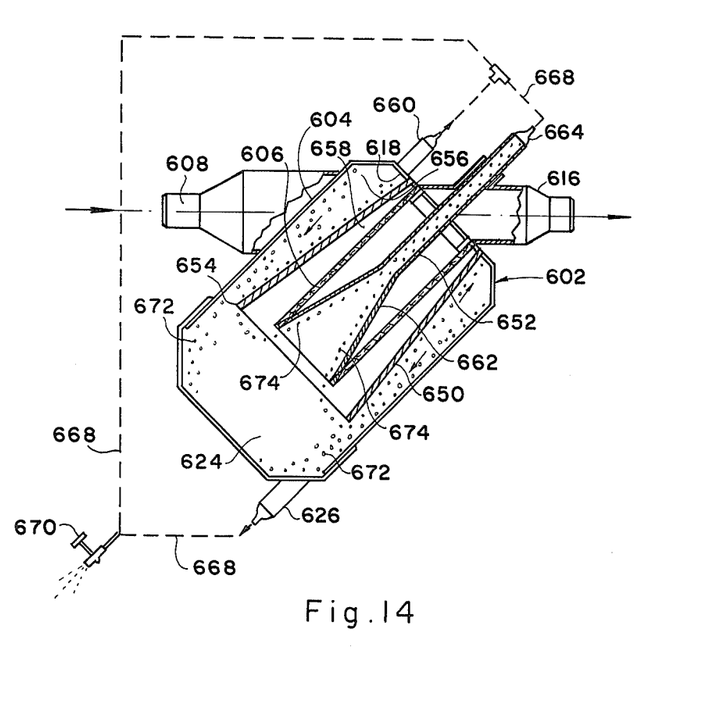
FIG. 14 illustrates a still further form of the invention.

The filter illustrated in FIG. 14 comprises a tubular housing, generally designated 602, having an inlet opening 604, a cylindrical filter body 606, a tubular inlet connection 608, and a tubular outlet connection 616, the inlet opening 604 being elongated in the longitudinal direction of the filter body 606 and extending for a major part of its length, all as in the above-described embodiments. The water inletted through inlet 608 and the elongated inlet opening 604 flows substantially tangentially to the outer cylindrical filter body 606, producing a cyclonic effect in which the dirt particles tend to accumulate in chamber 624 in the lower end of the housing which particles may be periodically discharged through port 626 by opening valve 628, all as described above.

Such a filter operates quite satisfactorily when the inletted water includes mostly relatively large dirt particles which are easily washed off the outer surface of the main filter body 606 by the cyclonic effect described. However, when the water also includes substantial amounts of minute dirt particles, such as micro-organisms, these minute particles tend to move by centripetal force into the main filter body 606 and thereby tend to clog it.

The modified filter illustrated in FIG. 14 is constructed so as to substantially reduce or eliminate the tendency of minute dirt particles to clog the main filter body 606. Thus, the filter comprises a large-diameter outer tubular baffle 650 enclosing the cylindrical filter body 606, and a small diameter inner tube 652 disposed within the filter body 606.

The outer tubular baffle 650 is of conical shape having its large diameter end 654, namely that facing the first accumulating chamber 624 at the lower end of the housing, open to the flow of the water inletted through the inlet connection 608 and the inlet opening 604. The opposite end of tubular baffle 650 at the upper end of the housing is joined to the housing annular wall 618.

Baffle 650 thus defines a first space 656 between it and the inlet opening 604, and a second space 658 between it and the cylindrical filter body 606. A port 660 is provided in the housing annular wall 618 at the upper end of the housing which port communicates with space 656.

The inner tube 652 disposed within the main filter body 606 includes a conical connection 662 joining the tube to the end of the filter body 606 facing the lower end of the housing. The opposite end of tube 652 at the upper end of the housing is provided with a further port 664.

The two newly added ports 660 and 664 are connected together and to port 626 from chamber 624 by means of a fluid connection 668 which includes a valve 670.

The filter of FIG. 14 operates in the following manner.

As described in the previous embodiments, the water inletted through inlet connection 608 and elongated opening 604 is caused to flow tangentially within space 656 to produce a cyclonic effect. The heavier particles in the water are thus thrust outwardly by centrifugal force and tend to accumulate in chamber 624 as described above, these larger particles being designated 672 in the attached drawing. The minute particles, such as micro-organisms, in the inletted water, which particles are designated 674 in the attached drawing, tend to move inwardly by centripetal force and some of them accumulate in space 656 at the upper end of the housing between it and the outer face of the conical baffle 654. In addition, these minute particles also tend to accumulate on the inner face of the inner pipe 652 at the upper end of the housing.

Accordingly, when valve 670 is opened, the heavier particles 672 within chamber 624 are purged through port 626. In addition, the minute light particles 674 accumulating on the outer face of baffle 654 in space 656 at the upper end of the housing are discharged through port 660, and the minute light particles 674 accumulating on the inner face of pipe 652 at the upper end of the housing are discharged via port 664.

Further variations, modifications and applications of the invention will be apparent.

What is claimed is:

1. An automatically self-cleaning filter comprising: a housing having an inlet connectable to the upstream pipe in a fluid line and an outlet connectable to the downstream pipe in the fluid line; a main filter body disposed within the housing for filtering the fluid flowing therethrough from its inlet to its outlet; said housing including a dirt-accumulating chamber at the upstream side of the main filter body for accumulating dirt particles not passing through the main filter body, and a dirt-purging port for discharging the accumulated dirt particles; a valve for opening and closing said port; a dirt-sensing filter located in the lower end of said chamber to receive on the upstream side thereof dirt particles accumulated in said chamber; said housing including a narrow passageway at the inlet side thereof upstream of the main filter body producing an increase in the velocity, and thereby a decrease in the static pressure, of the fluid flowing therethrough; a fluid connection connecting said narrow passageway to the opposite side of said dirt-sensing filter to produce a fluid flow through said dirt-sensing filter solely by the decreased pressure produced only by said narrow passageway; and sensing means sensing when a predetermined quantity of dirt particles has accumulated in said chamber as sensed by the dirt-sensing filter to automatically open said valve to discharge through said port the dirt particles accumulated in said chamber.

2. A filter according to claim 1, wherein said sensing means senses the differential fluid pressure on both sides of the dirt-sensing filter and is effective, when the differential pressure has reached a predetermined maximum, to automatically open said valve.

3. A filter according to claim 1, wherein said chamber accumulating the dirt particles is at lower elevation than said main filter body when the housing is connected in the fluid line.

4. A filter according to claim 1, wherein said main filter body is of cylindrical shape, and said narrow passageway directs the inletted fluid tangentially to the main filter body thereby to produce a cyclonic flow around the main filter body.

5. A filter according to claim 4, wherein one wall of said narrow passageway is defined by a deflector pivotably-mounted towards and away from the opposite wall of the passageway to decrease or increase the cross-sectional area thereof, said deflector including a spring urging the deflector towards said opposite wall tending to decrease the cross-sectional area of the passageway, and thereby to increase the velocity and to decrease the static pressure, of the fluid flowing therethrough; and means connected between said valve and said deflector and effective, upon the opening of said valve, to pivot said deflector away from said opposite wall, thereby to permit any large dirt particles lodged at the inner side of said passageway to pass therethrough and to be discharged through said port.

6. A filter according to claim 2, wherein said pressure sensing means comprises a fluid device including a displaceable member having means for applying to one side thereof a pressure substantially equal to that at the upstream side of the dirt-sensing filter, and means for applying to the opposite side thereof a pressure substantially equal to that at said opposite side of the dirt-sensing filter, such that when the latter pressure drops below a predetermined minimum, said member is displaced from a normal position to an actuated position opening said valve.

7. A filter according to claim 6, wherein said valve includes an actuator comprises a piston movable in a cylinder to open said valve when said displaceable member of the pressure sensing means is displaced to said actuated position, and to close said valve when said displaceable member is in said normal position.

8. A filter according to claim 1, wherein said dirt-sensing filter is of cylindrical shape and is located in a recess formed in the housing slightly upstream of said port.

9. A filter according to claim 1, wherein said dirt-sensing filter is of planar shape and covers a recess formed in the housing slightly upstream of said port.

10. A filter according to claim 1, wherein said valve is a diaphragm valve including a diaphragm closing said dirt-purging port but effective to open same when a predetermined quantity of dirt has accumulated in said dirt-accumulating chamber as sensed by the dirt-sensing filter therein.

11. A filter according to claim 10, wherein one face of said diaphragm is exposed to the pressure at the upstream side of the dirt-sensing filter, and the opposite face of the diaphragm is exposed to the pressure at said opposite side of the dirt-sensing filter, such that when the latter pressure drops to a predetermined value because of the accumulation of dirt particles in the chamber, the diaphragm is moved to open the dirt-purging port.

12. A filter according to claim 1, wherein said valve opening and closing the dirt-purging port is normally biassed to its open position and is automatically closed as soon as the upstream side of the main filter body is pressurized above a predetermined minimum pressure.

* * * * *